United States Patent
Sahara

(10) Patent No.: US 8,483,042 B2
(45) Date of Patent: Jul. 9, 2013

(54) MOBILE COMMUNICATION SYSTEM, BASE STATION DEVICE AND CHANNEL ALLOCATION METHOD

(75) Inventor: Toru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 274 days.

(21) Appl. No.: 12/988,303

(22) PCT Filed: Apr. 14, 2009

(86) PCT No.: PCT/JP2009/057526
§ 371 (c)(1),
(2), (4) Date: Oct. 15, 2010

(87) PCT Pub. No.: WO2009/128455
PCT Pub. Date: Oct. 22, 2009

(65) Prior Publication Data
US 2011/0032907 A1 Feb. 10, 2011

(30) Foreign Application Priority Data
Apr. 18, 2008 (JP) .................. 2008-108736

(51) Int. Cl.
*H04J 11/00* (2006.01)
*H04Q 7/00* (2006.01)
*H04B 7/212* (2006.01)

(52) U.S. Cl.
USPC ........... 370/208; 370/331; 370/337; 370/465; 455/436; 455/442

(58) Field of Classification Search
USPC .......... 370/208, 331, 337, 347, 465; 455/436, 455/442
See application file for complete search history.

(56) References Cited

U.S. PATENT DOCUMENTS

| | | | |
|---|---|---|---|
| 5,748,624 A | 5/1998 | Kondo | |
| 6,463,240 B2 | 10/2002 | Onuki et al. | |
| 2002/0160716 A1 | 10/2002 | Hiramatsu et al. | |
| 2003/0181814 A1* | 9/2003 | Ji et al. | 600/453 |
| 2004/0111236 A1* | 6/2004 | Lee et al. | 702/179 |
| 2005/0026615 A1* | 2/2005 | Kim | 455/436 |
| 2005/0111397 A1* | 5/2005 | Attar et al. | 370/319 |
| 2006/0009212 A1* | 1/2006 | Kim et al. | 455/423 |
| 2006/0172738 A1* | 8/2006 | Kwon et al. | 455/439 |

(Continued)

FOREIGN PATENT DOCUMENTS

| | | |
|---|---|---|
| EP | 0954192 A1 | 11/1999 |
| ER | 0 954 192 A1 | 3/1999 |

(Continued)

OTHER PUBLICATIONS

Notice of Grounds for Rejection dated Sep. 2, 2011, issued for counterpart Korean Application No. 10-2010-7023020.

(Continued)

*Primary Examiner* — Andrew Lee
(74) *Attorney, Agent, or Firm* — Procopio, Cory, Hargreaves & Savitch LLP

(57) ABSTRACT

A base station sends to a target base station a switching request which contains a time slot used in communication with a mobile station. The base station allocates to the mobile station at least one idle communication channel included in time slots different from the time slot contained in the switching request received from the base station.

15 Claims, 9 Drawing Sheets

U.S. PATENT DOCUMENTS

| | | | |
|---|---|---|---|
| 2007/0129075 A1* | 6/2007 | Kim et al. | 455/436 |
| 2007/0173271 A1* | 7/2007 | Hulkkonen et al. | 455/509 |
| 2007/0195900 A1* | 8/2007 | Lee et al. | 375/260 |
| 2010/0105393 A1* | 4/2010 | Etemad et al. | 455/437 |
| 2010/0120434 A1* | 5/2010 | Hasegawa | 455/436 |
| 2010/0330998 A1* | 12/2010 | Park et al. | 455/436 |

FOREIGN PATENT DOCUMENTS

| | | |
|---|---|---|
| GB | 2281177 A | 2/1995 |
| JP | 07-030949 A | 1/1995 |
| JP | 08-204673 A | 8/1996 |
| JP | 11-313357 A | 11/1999 |
| JP | 11-313537 A | 11/1999 |
| JP | 2001-235913 A | 8/2001 |
| JP | 2001-285913 A | 10/2001 |
| KR | 10-1999-0083478 A | 11/1999 |

OTHER PUBLICATIONS

International Search Report dated Jul. 28, 2009 issued by the Japanese Patent Office for International Application No. PCT/JP2009/057526.

Association of Radio Industries and Business (ARIB), "OFDMA/TDMA TDD Broadband Wireless Access System (Next Generation PHS) ARIB Standard", ARIB STD-T95, Version 1.0, Dec. 12, 2007.

Office Action dated Apr. 10, 2012, issued in counterpart Japanese Application No. 2008-108736.

* cited by examiner

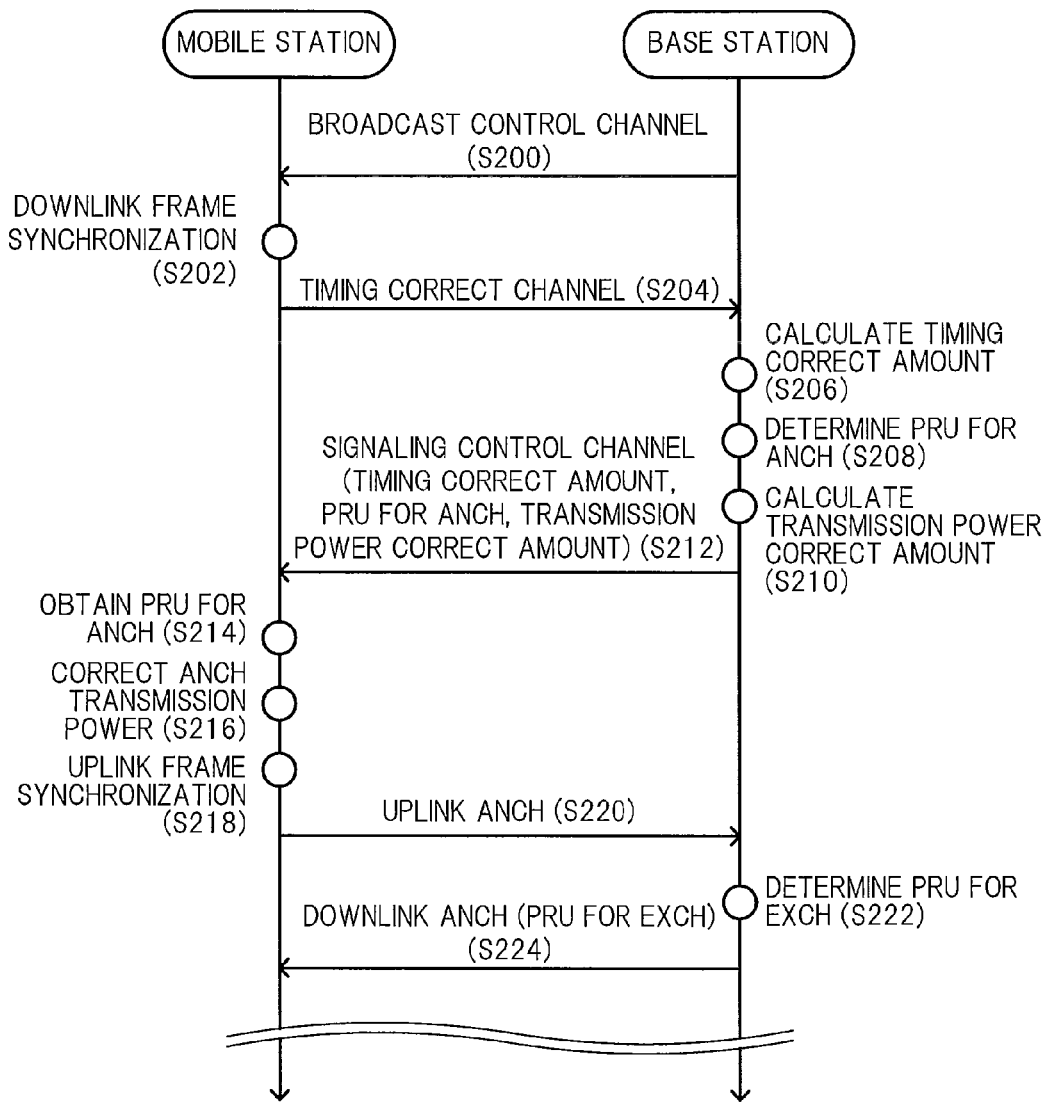

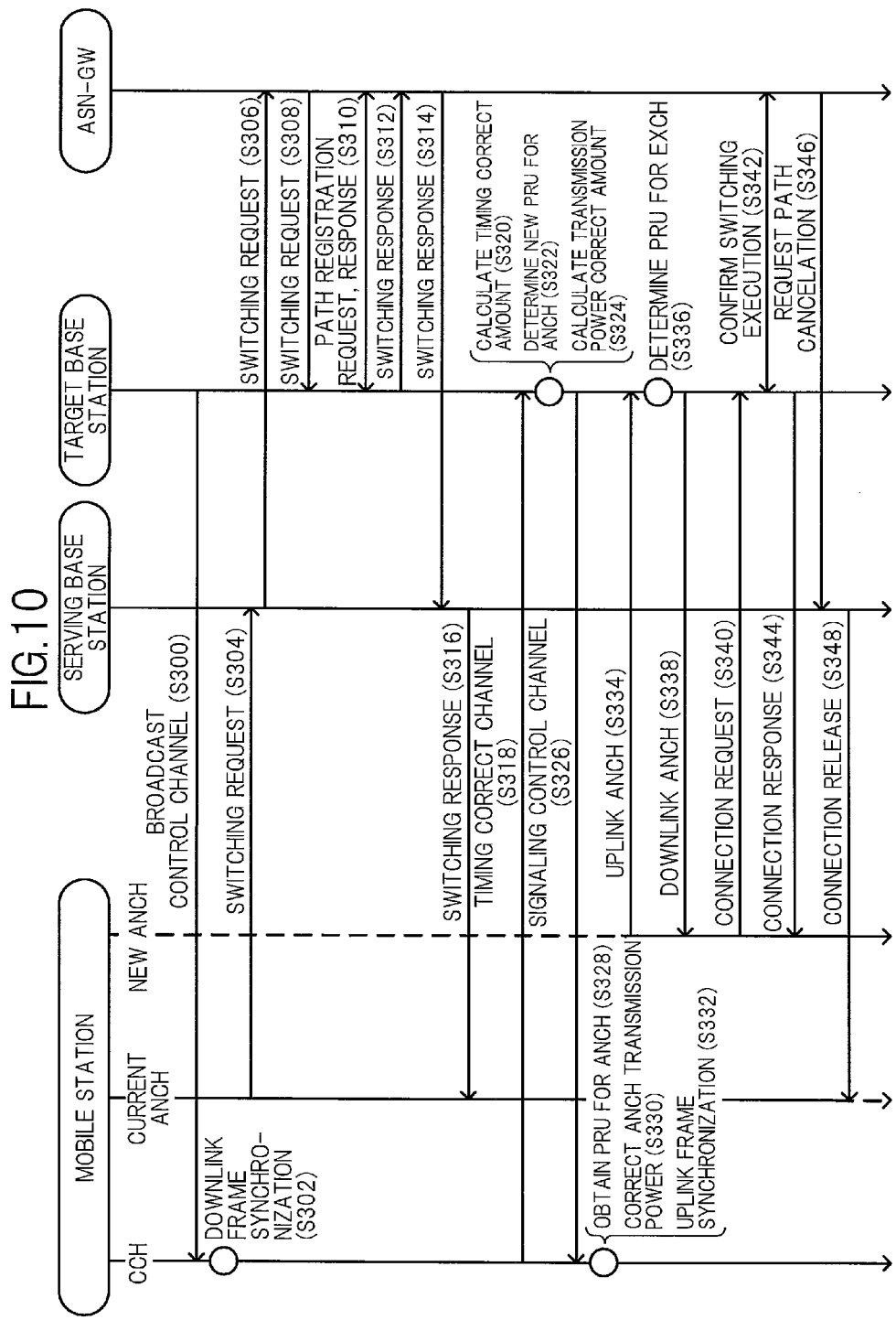

MOBILE COMMUNICATION SYSTEM, BASE STATION DEVICE AND CHANNEL ALLOCATION METHOD

TECHNICAL FIELD

The present invention relates to a mobile communication system, a base station device, and a channel allocation method and, in particular, to a technique for enabling a mobile station device to simultaneously communicate with two or more base station devices.

BACKGROUND ART

A next generation PHS (Next Generation Personal Handyphone System) is a mobile communication system which realizes high speed communication, using a TDMA/TDD (Time Division Multiple Access/Time Division Duplex) system and an OFDMA (Orthogonal Frequency Division Multiple Access) system. A radio communication interface of the next generation PHS is disclosed in the non-patent document 1 mentioned below.

FIG. 9 is a diagram showing a outgoing call sequence of the next generation PHS. As shown in the diagram, a base station regularly sends a broadcast control channel (BCCH) including the base station ID of its own station, transmission power control information (a negative value indicating the difference between an actual transmission power and the base station maximum transmission power), and so forth (S200). Meanwhile, a mobile station establishes frame synchronization in the downlink direction (the direction from the base station to the mobile station), based on the broadcast control channel (S202), and then sends a timing correct channel (TCCH) corresponding to an uplink synchronous burst signal to the base station (S204).

Having received the timing correct channel from the mobile station, the base station calculates the difference between the receive timing and a desired receive timing of the timing correct channel to use as a timing correct amount (S206). Then, one communication channel for ANCH (Anchor Channel) to be allocated to the mobile station is determined (S208). Note that, in the next generation PHS, each communication channel is composed of a combination of a time slot according to the TDMA (e.g., a time slot length 625 μs) and a subchannel according to the OFDMA, and referred to as a PRU (Physical Resource Unit).

The base station calculates the difference between the received power and a desired receive power of the timing correct channel to use as a correct amount of the transmission power of the mobile station (S210), and sends to the mobile station a signaling control channel (downlink SCCH) containing the timing correct amount calculated at S206, the PRU for ANCH, determined at S208, and the correct amount of the transmission power of the mobile station, calculated at S210 (S212).

Having received the signaling control channel from the base station, the mobile station obtains the PRU for ANCH from the received signaling control channel (S214). Then, the mobile station corrects the transmission power of the ANCH, based on the transmission power correct amount contained in the signaling control channel (S216), and also corrects the transmission timing, based on the timing correct amount contained in the signaling control channel, whereby frame synchronization in the uplink direction (the direction from the mobile station to the base station) is established (S218). Further, the mobile station sends an uplink ANCH to the base station, using the PRU for ANCH obtained at S214, with the transmission power corrected at S216 at the transmission timing corrected at S218 to request allocation of PRUs for EXCH (Extra Channel) (S220).

Having received the uplink ANCH from the mobile station, the base station determines PRUs for EXCH composed of one or more PRUs (S222), and sends a downlink ANCH containing the determined PRUs for EXCH to the mobile station (S224).

Note that, in the next generation PHS employing the OFDMA system, receive timing difference and received power difference among uplink signals sent from respective mobile stations cannot be individually corrected in the base station. Therefore, the transmission timing of an uplink signal is corrected in a mobile station, as described above, to prevent inter-symbol interference (ISI). Moreover, an appropriate transmission power is set for a mobile station to prevent interference with an adjacent cell.

RELATED DOCUMENT

Non-Patent Document 1: "ARIB STD-T95 'OFDMA/TDMA TDD Broadband Wireless Access System (Next Generation PHS) ARIB STANDARD', Ver. 1.0", Dec. 12, 2007, Association of Radio Industries and Business

DISCLOSURE OF THE INVENTION

Problems to be Solved by the Invention

According to a next generation PHS, when a mobile station performs a soft handover from a serving base station to a target base station (see FIG. 10), the transmission timing of an uplink signal to the serving base station and the transmission timing of an uplink ANCH to the target base station need to be individually controlled.

However, if the time slot of an ANCH to be allocated to the mobile station by the target base station is the same as any of the time slots of an ANCH and an EXCH allocated to the mobile station by the serving base station, the mobile station cannot individually control these two transmission timing points. This causes a problem of interference with another subcarrier.

This problem is not limited to the next generation PHS, but is commonly suffered in a mobile communication system in which a mobile station simultaneously communicates with two or more base stations employing a TDMA system and an OFDMA system.

The present invention has been conceived in view of the above, and aims to provide a mobile communication system, a base station device, and a channel allocation method capable of simultaneous communication with two or more base station devices employing the TDMA system and the OFDMA system without interference with another subcarrier.

Means for Solving the Problems

In order to solve the above described problem, a mobile communication system according to the present invention is a mobile communication system including a first base station device, a second base station device, and a mobile station device for carrying out simultaneous communication with the first base station device and the second base station device, in which at least one communication channel composed of a combination of any time slot according to time division multiple access and any subchannel according to orthogonal frequency division multiple access is used in the communication, in which the first base station device includes means for notifying the second base station device of a time slot used in the communication with the mobile station device, and the second base station device includes means for allocating to the mobile station device at least one idle communication channel included in time slots different from the time slot notified by the first base station device.

According to the present invention, the mobile station device can simultaneously communicate with two or more base station devices employing the TDMA system and the OFDMA system without interference with another subcarrier.

In one aspect of the present invention, the mobile station device may carry out simultaneous communication with the first base station device and the second base station device when performing a soft handover from the first base station device to the second base station device.

According to this aspect, the mobile station device can perform a soft handover without interference with another subcarrier.

In one aspect of the present invention, a single channel composed of one communication channel may be used in the communication.

In one aspect of the present invention, a complex channel composed of one or more communication channels may be used in the communication. In this aspect, the first base station device may further include means for restricting, when the communication channel allocated to the mobile station device includes a plurality of time slots, use of some of the time slots constituting the communication channel.

A base station device according to the present invention is a base station device for carrying out communication with a mobile station device, using at least one communication channel composed of a combination of anytime slot according to time division multiple access and any subchannel according to orthogonal frequency division multiple access, the base station device including means for receiving notification from another base station device of a time slot used by the other base station device in communication with the mobile station device and means for allocating to the mobile station device at least one idle communication channel included in time slots other than the time slot notified by the other base station device.

A channel allocation method according to the present invention is a channel allocation method for a base station device for carrying out communication with a mobile station device, using at least one communication channel composed of a combination of any time slot according to time division multiple access and any subchannel according to orthogonal frequency division multiple access, the method including a step of receiving notification from another base station device, of a time slot used by the other base station device in communication with the mobile station device, and a step of allocating to the mobile station device at least one idle communication channel included in time slots other than the time slot notified by the other base station device.

BRIEF DESCRIPTION OF THE DRAWINGS

FIG. 9 is a diagram showing a outgoing call sequence of a next generation PHS; and FIG. 10 is a diagram showing a handover sequence of the next generation PHS.

BEST MODE FOR CARRYING OUT THE INVENTION

In the following, one embodiment of the present invention will be described in detail based on the drawings.

Figure 1:
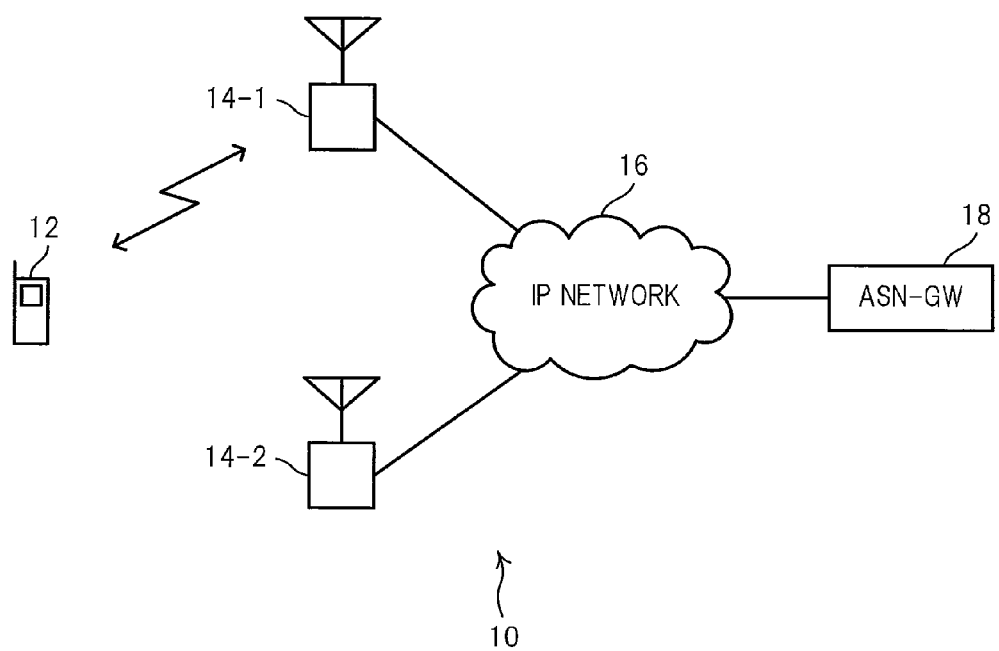
FIG. 1 is an entire configuration diagram of a mobile communication system according to an embodiment of the present invention.

FIG. 1 is an entire configuration diagram of a mobile communication system 10 according to one embodiment of the present invention. As shown in the diagram, the mobile communication system 10 includes a plurality of mobile stations 12 (only one shown here), a plurality of base stations 14 (only a serving base station 14-1 communicating with the mobile station 12 and a target base station 14-2 for handover of the mobile station 12 are shown here), and an ASN gateway 18 (ASN-GW: access service network gateway). The base stations 14-1 and 14-2 and the ASN gateway 18 are mutually connected via an IP network 16.

The base station 14 employs a TDMA/TDD system and an OFDMA system, and communicates with the mobile station 12, using at least one communication channel composed of any time slot according to the TDMA and any subchannel according to the OFDMA.

The ASN gateway 18 is a publicly known server computer which carries out relay of communication between base stations, authentication management, radio resource management, handover control, and so forth.

The mobile communication system 10 can realize high speed handover as transmission of a timing correct channel (TCCH) by a mobile station (S318) and transmission of a signaling control channel (downlink SCCH) by a target base station (S326) can be omitted from the handover sequence shown in FIG. 10.

In the following, structures provided to the mobile station 12 and the base station 14 to achieve the above described high speed handover will be described.

Figure 2:
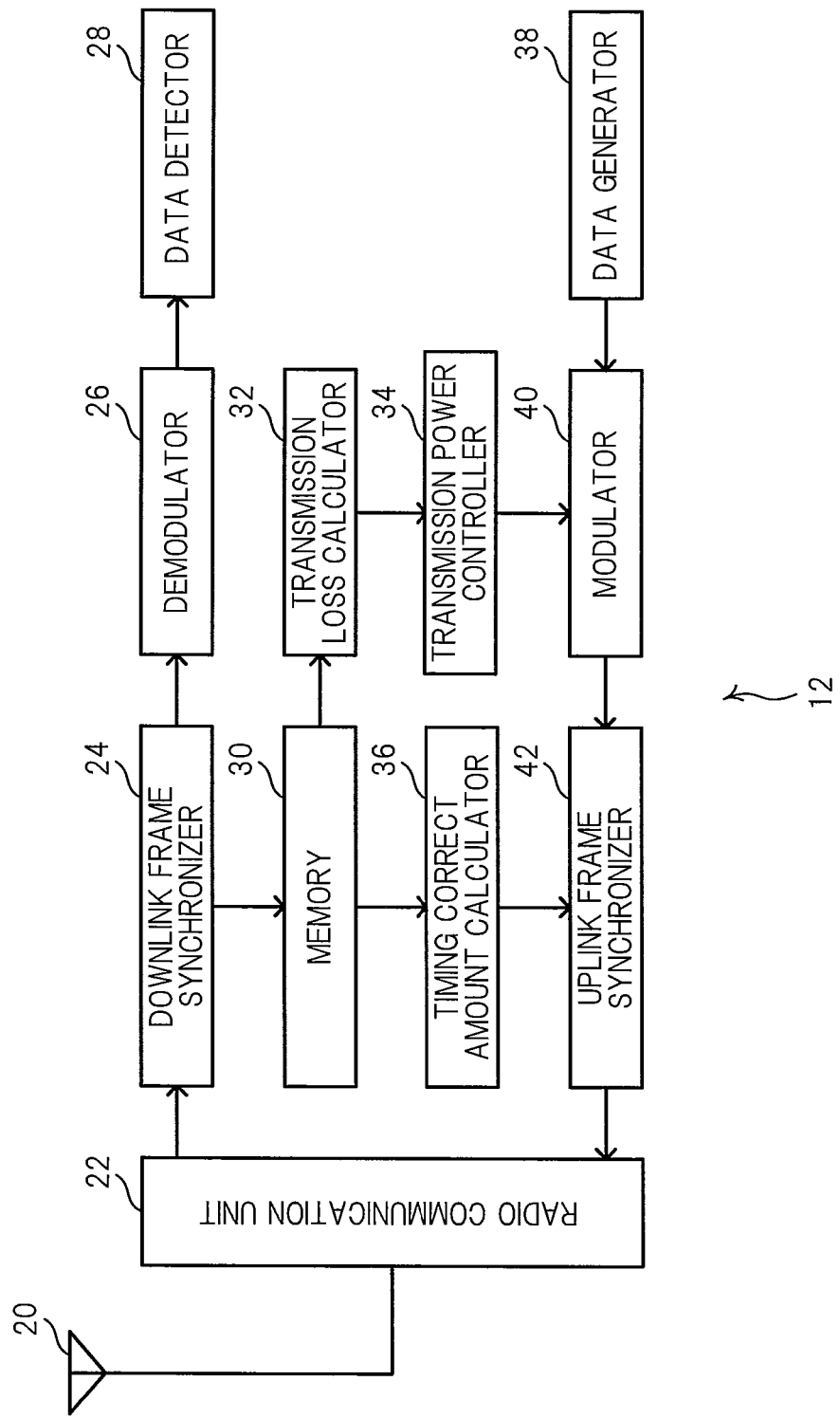
FIG. 2 is a functional block diagram of a mobile station according to the embodiment of the present invention.

FIG. 2 is a functional block diagram of the mobile station 12. As shown in the diagram, the mobile station 12 includes an antenna 20, a radio communication unit 22, a downlink frame synchronizer 24, a demodulator 26, a data detector 28, a memory 30, a transmission loss calculator 32, a transmission power controller 34, a timing correct amount calculator 36, a data generator 38, a modulator 40, and an uplink frame synchronizer 42, with some of these elements built from, e.g., a CPU (Central Processing Unit) or a DSP (Digital Signal Processor).

The antenna 20 receives a radio signal, and outputs the received radio signal to the radio communication unit 22. Also, the antenna 20 sends a radio signal supplied from the radio communication unit 22 to the base station 14. Reception and transmission of a radio signal is switched in response to an instruction from the radio communication unit 22 in a time division manner.

The radio communication unit 22 includes a low noise amplifier, a power amplifier, a local oscillator, a mixer, and a filter. The radio communication unit 22 amplifies a radio signal input from the antenna 20 in the low noise amplifier, and down-converts the amplified radio signal into an intermediate frequency signal before outputting to the downlink frame synchronizer 24. Also, the radio communication unit 22 up-converts a modulated signal input from the uplink frame synchronizer 42 into a radio signal, and amplifies the resultant signal in the power amplifier up to a transmission power level before supplying to the antenna 20.

The downlink frame synchronizer 24 determines correlation between a signal input from the radio communication unit 22 and a known signal to determine as a receive timing of a downlink signal sent from the base station 14 a time when correlation of a value equal to or larger than a predetermined value is determined. Then, based on the determined receive timing of the downlink signal, the downlink frame synchronizer 24 establishes frame synchronization in the downlink direction with the base station 14. Moreover, the downlink frame synchronizer 24 measures the received power of a downlink signal sent from the base station 14.

The demodulator 26 includes an A/D converter, a serial/parallel converter, an FFT (Fast Fourier Transform) calculator, and a parallel/serial converter, and performs guard interval (GI) removal, A/D conversion, serial/parallel conversion, discrete Fourier transform, parallel/serial conversion, and so forth with respect to a signal input from the downlink frame synchronizer 24 to obtain a successive complex symbol string, which are then output to the data detector 28.

The data detector 28 detects a data bit string (received data) among the complex symbol string input from the demodulator 26, the data bit string being in accordance with the modulation scheme of the symbol, and outputs the detected received data to a higher layer (not shown).

The memory 30 includes, e.g., semiconductor memory elements, and stores the receive timing of a downlink signal, determined by the downlink frame synchronizer 24, and the received power of a downlink signal, measured also by the downlink frame synchronizer 24.

The transmission loss calculator 32 calculates the transmission loss of a downlink signal sent from the base station 14 (a downlink common channel (CCH) or a downlink individual channel (ICH)). A broadcast control channel (BCCH) is one of the downlink common channels (CCH).

Figure 3:
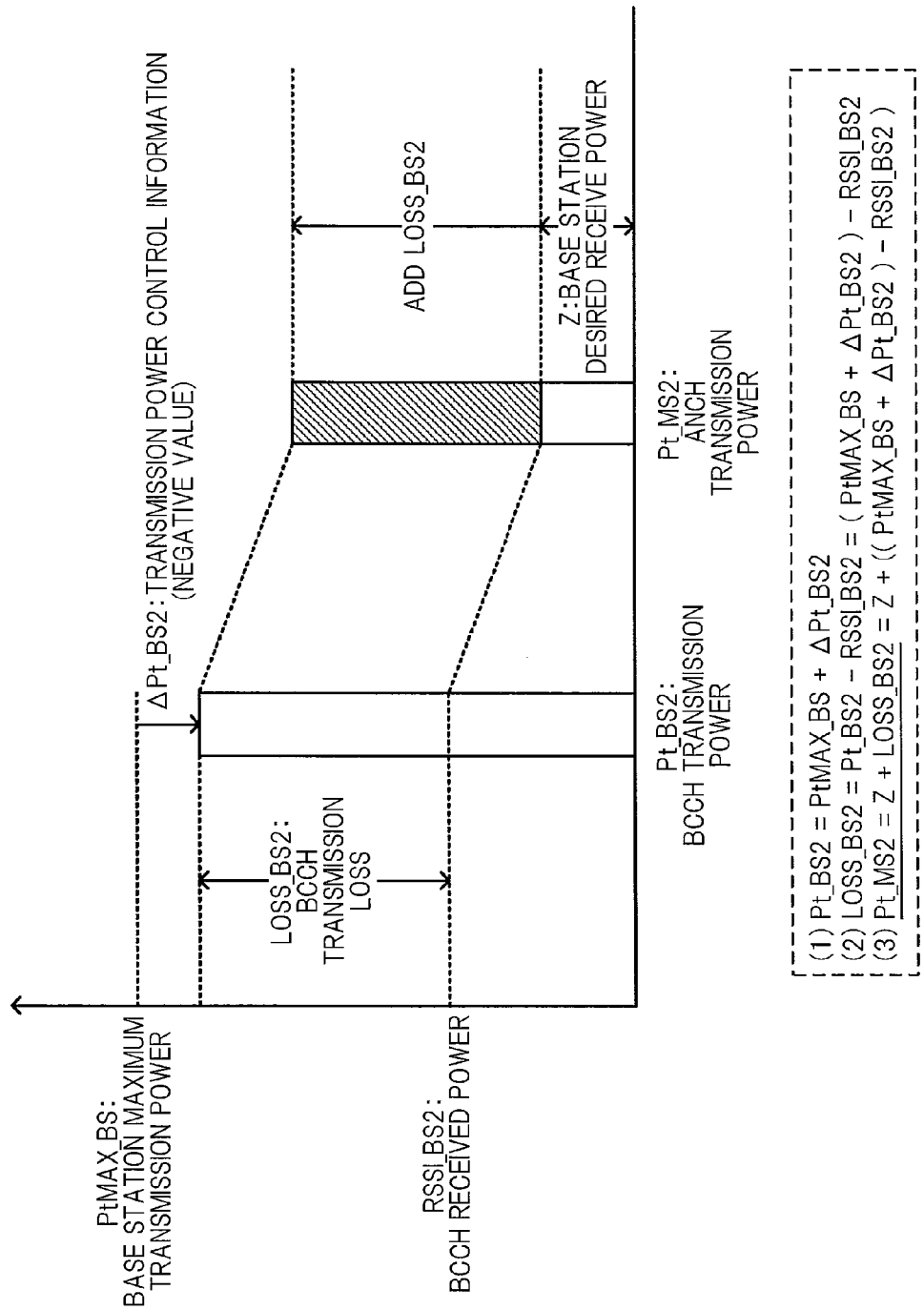
FIG. 3 is a diagram describing a method for calculating an ANCH transmission power.

In the following, a method for calculating the transmission loss of a broadcast control channel sent from the target base station 14-2 will be described referring to FIG. 3. As shown in the diagram, the transmission loss LOSS_BS2 of a broadcast control channel sent from the target base station 14-2 corresponds to the difference between the transmission power Pt_BS2 of the broadcast control channel and the received power RSSI_BS2 of the same in the mobile station 12, the transmission loss LOSS_BS2 can be expressed as LOSS_BS2=Pt_BS2−RSSI_BS2. Here, assuming that the known base station maximum transmission power is denoted as PtMAX_BS and transmission power control information (a negative value contained in the broadcast control channel) of the broadcast control channel is denoted as $\Delta$Pt_BS2, the transmission power Pt_BS2 of the broadcast control channel is expressed as Pt_BS2=PtMAX_BS+$\Delta$Pt_BS2. Therefore, the transmission loss LOSS_BS2 of the broadcast control channel sent from the target base station 14-2 is calculated as LOSS_BS2=(PtMAX_BS+$\Delta$Pt_BS2)−RSSI_BS2. The thus calculated transmission loss LOSS_BS2 can be regarded as the transmission loss between the mobile station 12 and the base station 14-2.

As described above, the transmission loss calculator 32 calculates the transmission loss LOSS_BS2 of a broadcast control channel, based on the known base station maximum transmission power PtMAX_BS, the transmission power control information $\Delta$Pt_BS2 contained in the broadcast control channel, and the received power RSSI_BS2 of the broadcast control channel, stored in the memory 30.

The transmission power controller 34 controls the transmission power of an uplink signal to a base station 14. In particular, when the mobile station 12 performs a handover from the base station 14-1 to the base station 14-2, the transmission power controller 34 controls the transmission power of an ANCH such that the received power of the ANCH in the target base station 14-2 becomes equal to the base station desired receive power Z. Note that a PRU for ANCH (a single channel composed of a single communication channel) for use in communication with the target base station 14-2 is notified by the target base station 14-2 via a switching response sent from the serving base station 14-1, as to be described later.

In the following, a method for calculating the transmission power of an ANCH to the target base station 14-2 will be described referring to FIG. 3. As shown in the diagram, in order to obtain the received power of an ANCH in the target base station 14-2, the received power being equal to the known base station desired receive power Z, a power obtained by adding the above described transmission loss LOSS_BS2 between the mobile station 12 and the base station 14-2 to the base station desired receive power Z may be determined as the transmission power Pt_MS2 of the ANCH. That is, the transmission power Pt_MS2 may be determined as Pt_MS2=Z+LOSS_BS2.

As described above, the transmission power controller 34 calculates the transmission power Pt_MS2 of an ANCH to the target base station 14-2, based on the known base station desired receive power Z and the transmission loss LOSS_BS2 calculated by the transmission loss calculator 32. The calculated transmission power Pt_MS2 is supplied to the modulator 40.

Figure 4:
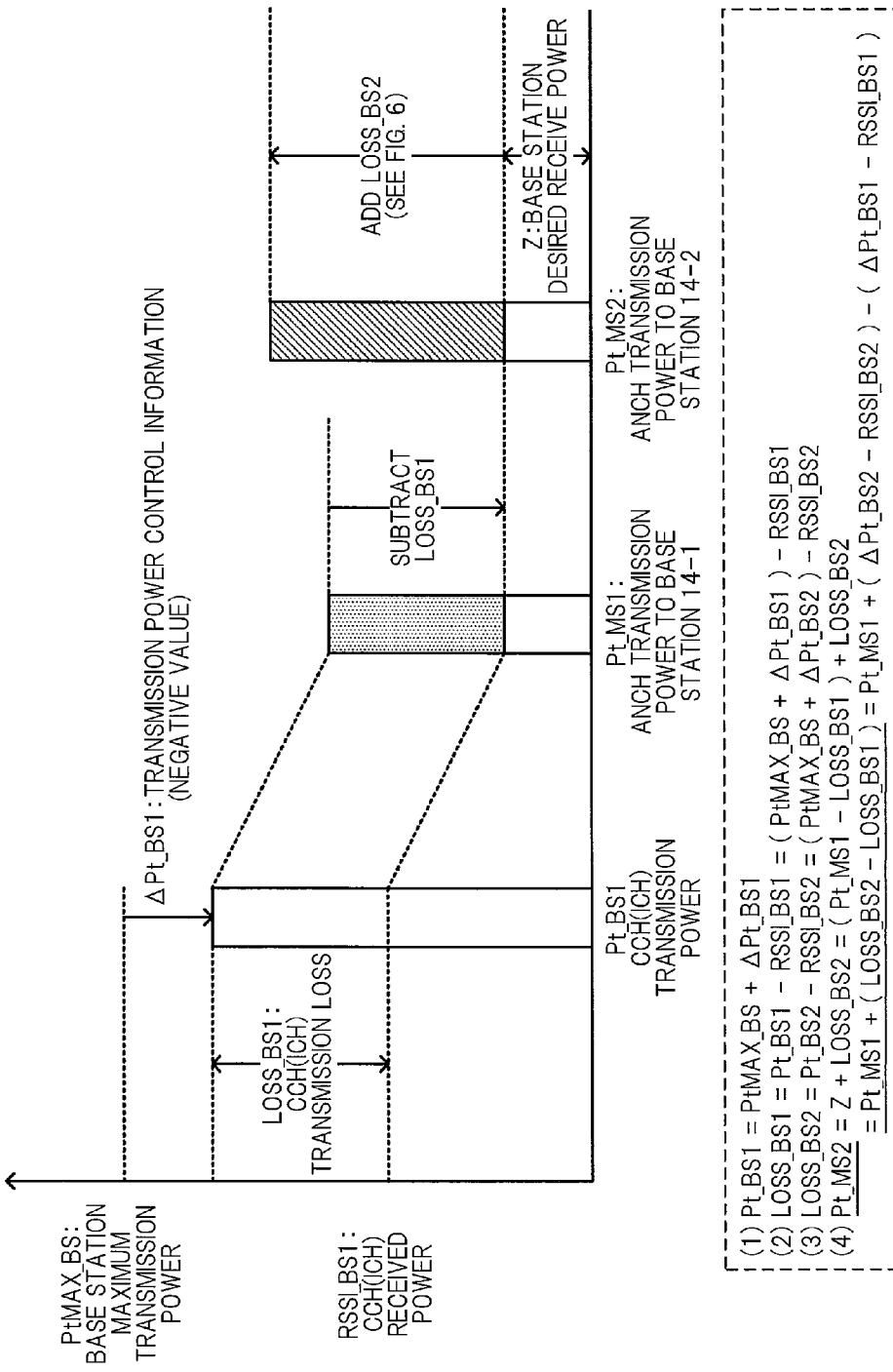
FIG. 4 is a diagram describing another method for calculating an ANCH transmission power.

Note that the transmission power controller 34 may control the transmission power Pt_MS2 of an ANCH, using any other method. FIG. 4 is a diagram showing another method for calculating the transmission power of an ANCH to the target base station 14-2. This method is based on an assumption that the transmission power of an uplink signal to the serving base station 14-1 is controlled in advance such that the received power of the uplink signal (uplink CCH or uplink ICH) in the base station 14-1 becomes equal to the base station desired receive power Z.

As shown in FIG. 4, as the transmission loss LOSS_BS1 of a downlink signal (downlink CCH or downlink ICH) sent from the serving base station 14-1 corresponds to the difference between the transmission power Pt_BS1 of the same and the received power RSSI_BS1 of the same in the mobile station 12, the transmission loss LOSS_BS1 can be expressed as LOSS_BS1=Pt_BS1−RSSI_BS1. Here, assuming that the transmission power control information (a negative value contained in the downlink signal) of a downlink signal is expressed as $\Delta$Pt_BS1, the transmission power Pt_BS1 of the same can be expressed as Pt_BS1=PtMAX_BS_$\Delta$Pt_BS1. Therefore, the transmission loss LOSS_BS1 of a downlink signal sent from the serving base station 14-1 is calculated as LOSS_BS1=(PtMAX_BS+$\Delta$Pt_BS1)−RSSI_BS1. The thus calculated transmission loss LOSS_BS1 can be regarded as the transmission loss between the mobile station 12 and the base station 14-1.

Further, as the transmission power Pt_MS1 of an uplink signal to the serving base station 14-1 is determined such that the received power of the same in the base station 14-1 becomes equal to the base station desired receive power Z, subtraction of the transmission loss LOSS_BS1 between the mobile station 12 and the base station 14-1 from the transmission power Pt_MS1 of the uplink signal provides the base station desired receive power Z. That is, the base station desired receive power Z is calculated as Z=Pt_MS1−LOSS_BS1.

As described above, as the transmission power Pt_MS2 of an ANCH to the target base station 14-2 can be expressed as Pt_MS2=Z+LOSS_BS2, substitution of Z=Pt_MS1−LOSS_BS1 in Pt_MS2=Z+LOSS_BS2 results in Pt_MS2=Pt_MS1+(LOSS_BS2−LOSS_BS1).

In this manner, the transmission power controller 34 may calculate the transmission power Pt_MS2 of an ANCH to the target base station 14-2, based on the transmission power Pt_MS1 of an uplink signal to the serving base station 14-1 and the difference between the transmission loss LOSS_BS1 of a downlink signal sent from the serving base station 14-1 and the transmission loss LOSS_BS2 of a broadcast control channel sent from the target base station 14-2.

Figure 5:
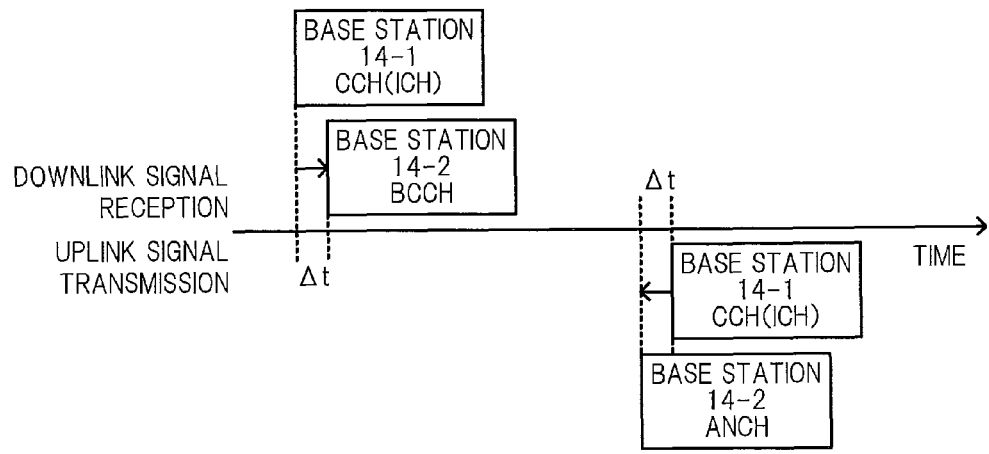
FIG. 5 is a diagram showing an ANCH transmission timing.

When the mobile station 12 performs a handover from the base station 14-1 to the base station 14-2, as shown in FIG. 5, the timing correct amount calculator 36 calculates the time difference between the receive timing of a downlink signal (downlink CCH or downlink ICH) sent from the serving base station 14-1 and the receive timing of a broadcast control channel (BCCH) sent from the target base station 14-2 to use as a timing correct amount Δt, and supplies the calculated timing correct amount Δt to the uplink frame synchronizer 42. The above described two receive timing points for use in calculation of the timing correct amount Δt are read from the memory 30.

Note that, however, in the mobile communication system 10, the time slot for transmission of a downlink signal by the serving base station 14-1 may differ from the time slot for transmission of a broadcast control channel by the target base station 14-2. In this case, the timing correct amount calculator 36 determines a value obtained by subtracting the interval (a multiple of a time slot length) between the two time slots from the above described time difference to use as a timing correct amount Δt.

Figure 6:
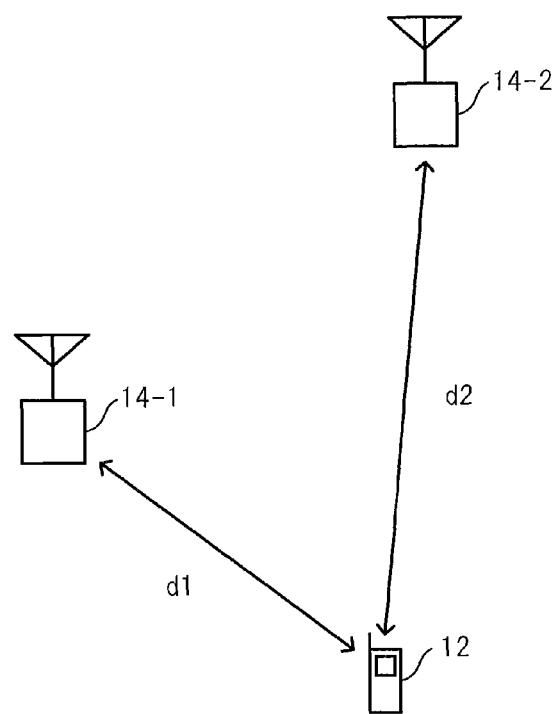
FIG. 6 is a diagram showing a positional relationship between a mobile station and a base station when a handover takes place.

The thus calculated timing correct amount Δt corresponds to the difference between the distance d1 between the mobile station 12 and the base station 14-1 and the distance d2 between the mobile station 12 and the base station 14-2, as shown in FIG. 6. That is, assuming that the velocity of light is defined as c, the timing correct amount Δt can be expressed as Δt=(d1−d2)/c.

The data generator 38 adds header information and the like in accordance with the format of the transmission channel to a data bit string input from a higher layer (not shown) to thereby generate transmission data. The generated transmission data is output to the modulator 40.

The modulator 40 includes a serial/parallel converter, an IFFT (Inverse Fast Fourier Transform) calculator, a parallel/serial converter, and a D/A converter. The modulator 40 carries out symbol mapping (amplitude and phase allocation) in accordance with the modulation scheme with respect to transmission data input from the data generator 38 to thereby obtain a complex symbol string.

Further, the modulator 40 divides the thus obtained complex symbol string into subcarrier components, and adjusts subcarrier components corresponding to the PRU allocated by the base station 14 such that the transmission power of an uplink signal (an uplink ANCH or the like) becomes equal to the transmission power calculated by the transmission power controller 34. Then, the modulator 40 carries out serial/parallel conversion, inverse discrete Fourier transform, parallel/serial conversion, D/A conversion, and so forth, with respect to the respective adjusted carrier components of the complex symbol string, to thereby obtain a baseband OFDM signal. The thus obtained baseband OFDM signal is given a guard interval before being output to the uplink frame synchronizer 42.

When the mobile station 12 performs a handover from the serving base station 14-1 with frame synchronization established in the uplink direction to the base station 14-2, the uplink frame synchronizer 42 corrects the transmission timing of an ANCH to the target base station 14-2, based on the timing correct amount Δt calculated by the timing correct amount calculator 36.

That is, when a BCCH sent from the target base station 14-2 is received later by a period of time |Δt| than a downlink signal (downlink CCH or downlink ICH) sent from the serving base station 14-1, as shown in FIG. 5, the uplink frame synchronizer 42 outputs an ANCH signal to the radio communication unit 22 earlier by a period of time |Δt| than the transmission timing of an uplink signal (uplink CCH or uplink ICH) to the base station 14-1. Meanwhile, when a BCCH sent from the target base station 14-2 is received earlier by a period of time Δt than a downlink signal (downlink CCH or downlink ICH) sent from the serving base station 14-1, the uplink frame synchronizer 42 outputs an ANCH signal to the radio communication unit 22 later by a period of time Δt than the transmission timing of an uplink signal (uplink CCH or uplink ICH) to the base station 14-1.

Note that when the time slot for transmission of an uplink signal to the serving base station 14-1 differs from the time slot for transmission of an ANCH to the target base station 14-2, the uplink frame synchronizer 42 corrects the transmission timing of the ANCH in further consideration of the interval (a multiple of a time slot length) between the time slots.

Figure 7:
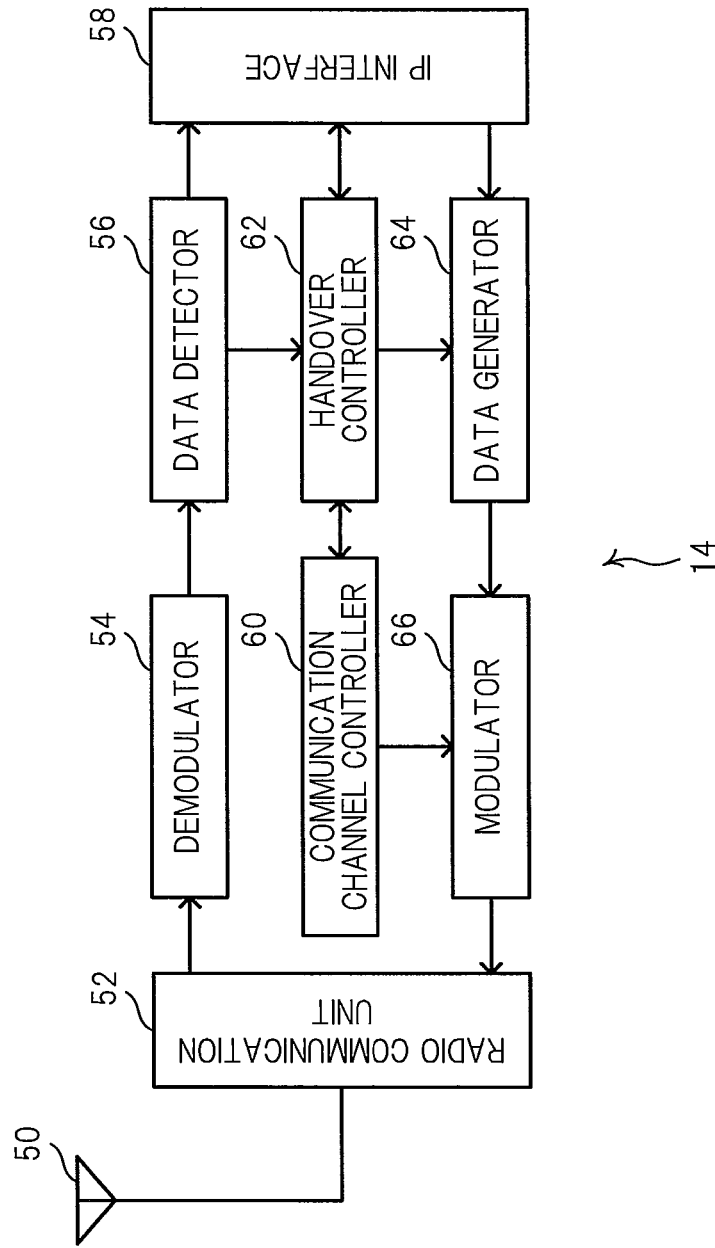
FIG. 7 is a functional block diagram of a base station according to the embodiment of the present invention.

FIG. 7 is a functional block diagram of the base station 14. As shown in the diagram, the base station 14 includes an antenna 50, a radio communication unit 52, a demodulator 54, a data detector 56, an IP interface 58, a communication channel controller 60, a handover controller 62, a data generator 64, and a modulator 66, with some of these elements built from, e.g., a CPU or a DSP.

The antenna 50 receives a radio signal and outputs the received radio signal to the radio communication unit 52. Also, the antenna 50 sends a radio signal supplied from the radio communication unit 52 to the mobile station 12. Note that reception and transmission of a radio signal is switched in response to an instruction from the radio communication unit 52 in a time division manner.

The radio communication unit 52 includes a low noise amplifier, a power amplifier, a local oscillator, a mixer, and a filter. The radio communication unit 52 amplifies a radio signal input from the antenna 50 in the low noise amplifier, and down-converts the amplified radio signal into an intermediate frequency signal before outputting to the demodulator 54. Also, the radio communication unit 52 up-converts a modulated signal input from the modulator 66 into a radio signal, and amplifies the resultant signal in the power amplifier up to a transmission power level before supplying to the antenna 50.

The demodulator 54 includes an A/D converter, a serial/parallel converter, an FFT calculator, and a parallel/serial converter. The demodulator 54 performs guard interval (GI)

removal, A/D conversion, serial/parallel conversion, discrete Fourier transform, parallel/serial conversion, and so forth with respect to a signal input from the radio communication unit 52 to thereby obtain a successive complex symbol string, which are then output to the data detector 56.

The data detector 56 detects a data bit string (received data) among the complex symbol string input from the demodulator 54, the data bit string being in accordance with the modulation scheme of the symbol, and outputs the detected received data to the IP interface 58, the handover controller 62, and so forth.

The IP interface 58 adds a predetermined IP header to data input from the handover controller 62 or the data generator 64 to thereby generate an IP packet, and sends the IP packet to another base station 14 or the ASN gateway 18 via the IP network 16. Also, the IP interface 58 receives an IP pocket sent from another base station 14 or the ASN gateway 18 via the IP network 16, and supplies payload data contained in the received IP packet to the handover controller 62, the data generator 64, and so forth.

In response to a request from the mobile station 12, the communication channel controller 60 determines a PRU for ANCH (a single channel composed of a single communication channel) and PRUs for EXCH (a complex channel composed of one or more communication channels), and so forth to be allocated to the mobile station 12, and notifies the mobile station 12 of the determined PRUs.

When the received data detected by the data detector 56 is a switching request from the mobile station 12 with which the base station 14 is communicating, the handover controller 62 generates a switching request containing the PRU for ANCH allocated to the mobile station 12 by the communication channel controller 60, and sends the generated switching request to the target base station 14-2 via the ASN gateway 18. Thereafter, the handover controller 62 notifies the communication channel controller 60 of a new PRU for ANCH contained in a switching response received from the target base station 14-2, and instructs the data generator 64 to send the switching response to the mobile station 12.

In this case, the communication channel controller 60 changes, when necessary, allocation of PRUs for EXCH so as to assure that the time slot for the new PRU for ANCH notified by the handover controller 62 is different from that of the PRUs for EXCH allocated to the mobile station 12. That is, the communication channel controller 60 restricts PRUs for EXCH to be allocated to the mobile station 12 to time slots other than the time slot for the new PRU for ANCH notified by the handover controller 62.

Meanwhile, when the data input from the IP interface 58 is a switching request from the base station 14-1 which is communicating with the mobile station 12, the handover controller 62 notifies the communication channel controller 60 of the PRU for ANCH contained in the switching request. In this case, the communication channel controller 60 determines, as a new PRU for ANCH, one idle PRU contained in a time slot different from the time slot for the PRU for ANCH notified by the handover controller 62. Then, the handover controller 62 generates a switching response containing the new PRU for ANCH determined by the communication channel controller 60, and sends the switching response via the ASN gateway 18 to the base station 14-1.

The data generator 64 adds header information and the like in accordance with the format of the transmission channel to the data bit string input from the IP interface 58 or the handover controller 62 to thereby generate transmission data, which is then output to the modulator 66.

The modulator 66 includes a serial/parallel converter, an IFFT calculator, a parallel/serial converter, and a D/A converter. The modulator 66 carries out symbol mapping, serial/parallel conversion, inverse discrete Fourier transform, parallel/serial conversion, D/A conversion, and so forth with respect to transmission data input from the data generator 64 to thereby obtain a baseband OFDM signal. The thus obtained baseband OFDM signal is given a guard interval before being output to the radio communication unit 52.

Figure 8:
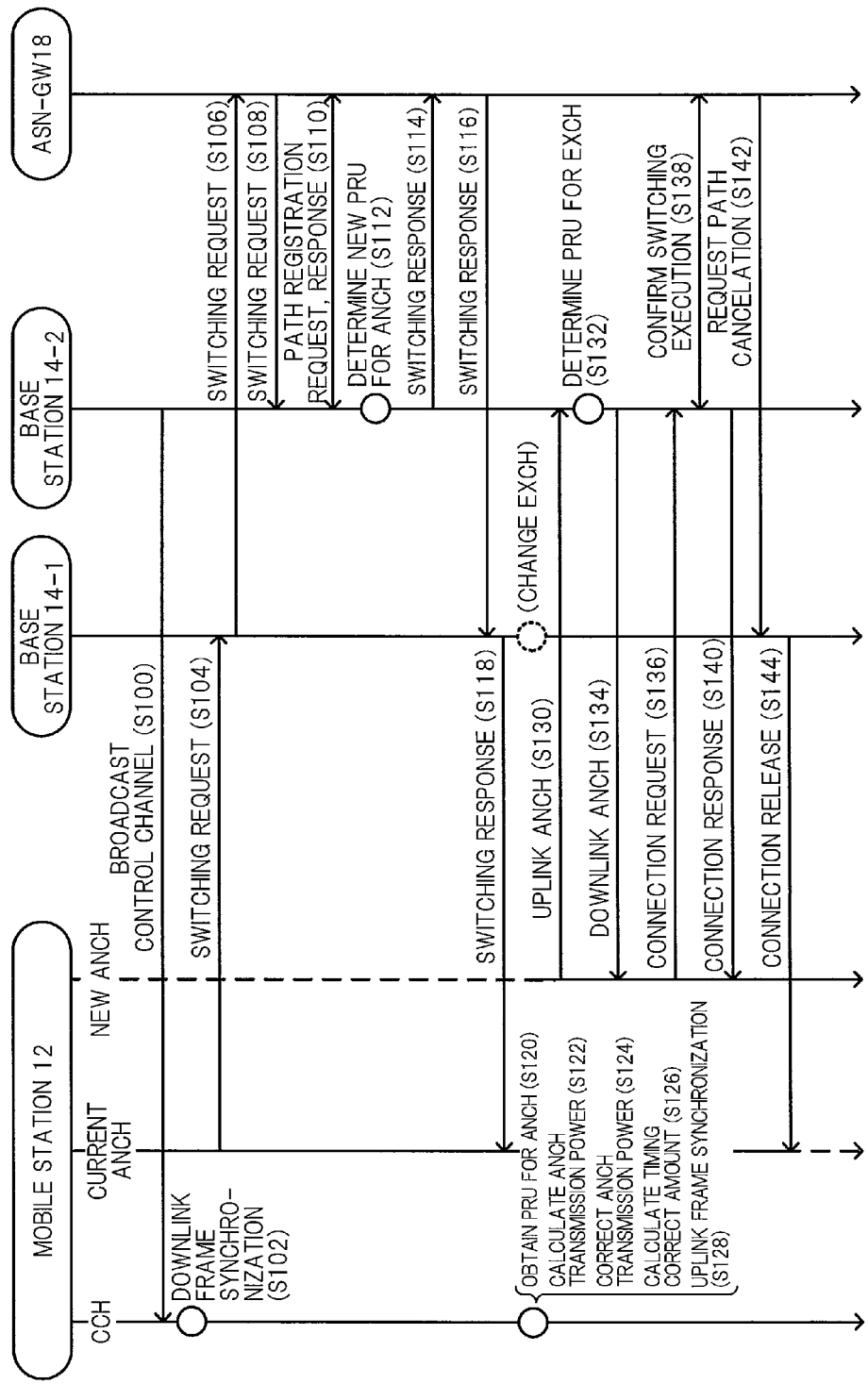
FIG. 8 is a diagram showing a handover sequence according to the embodiment of the present invention.

In the following, a handover sequence to be followed when the mobile station 12 performs a handover from the serving base station 14-1 to the base station 14-2 will be described referring to FIG. 8. Note that the handover here is a soft handover in which the mobile station 12 communicates with the serving base station 14-1 and the target base station 14-2 simultaneously. Assume that the mobile station 12 has already established frame synchronization in the uplink direction with the serving base station 14-1. Also, assume that the transmission power Pt_MS1 of an uplink signal (uplink CCH or uplink ICH) to the base station 14-1 has been adjusted such that the received power of the same in the base station 14-1 becomes equal to the base station desired receive power Z.

As shown in the diagram, the base station 14 regularly sends a broadcast control channel (BCCH) containing the base station ID of its own station and transmission power control information (S100). The mobile station 12 establishes frame synchronization in the downlink direction with the base station 14-2, based on a broadcast control channel (the broadcast control channel sent from the base station 14-2 here) with the highest received power among those sent from the respective base stations 14 (S102). In the above, the mobile station 12 stores in the memory 30 the receive timing and received power of the broadcast control channel sent from the base station 14-2.

Thereafter, the mobile station 12 sends a switching request addressed to the base station 14-2 to the serving base station 14-1 (S104). Having received the switching request from the mobile station 12, the base station 14-1 generates a switching request containing the PRU for ANCH allocated to the mobile station 12 by the base station 14-1, and sends the generated switching request via the ASN gateway 18 to the target base station 14-2 (S106, S108).

Having received the switching request from the base station 14-1, the base station 14-2 exchanges a path registration request, a path registration response, authentication information, and so forth with the ASN gateway 18 (S110), and then determines, as a new PRU for ANCH, one idle PRU contained in a time slot other than the time slot for the PRU for ANCH, contained in the switching request (S112). Thereafter, a switching response containing the determined new PRU for ANCH is sent via the ASN gateway 18 to the base station 14-1 (S114, S116).

Having received the switching response from the base station 14-2, the base station 14-1 sends a switching response containing the new PRU for ANCH, determined by the base station 14-2, to the mobile station 12 (S118). Note that the base station 14-1 changes, when necessary, allocation of PRUs for EXCH so as to assure that the time slot for the new PRU for ANCH, determined by the base station 14-2, is different from that of the PRUs for EXCH allocated to the mobile station 12 by the base station 14-1.

Having received the switching request from the serving base station 14-1, the mobile station 12 obtains the new PRU for ANCH from the switching response (S120). Thereafter, the mobile station 12 calculates the transmission loss of the broadcast control channel, that is, the transmission loss between the mobile station 12 and the base station 14-2, based on the known base station maximum transmission power, the transmission power control information contained in the broadcast control channel received at S100, and the received power of the broadcast control channel, stored in the memory 30. Then, the transmission power of an ANCH to the target base station 14-2 is calculated and corrected based on the known base station desired receive power and the calculated transmission loss between the mobile station 12 and the base station 14-2 (S122, S124).

In addition, the mobile station 12 reads from the memory 30 the receive timing of a downlink signal (downlink CCH or downlink ICH) from the serving base station 14-1 and the receive timing of a broadcast control channel from the target base station 14-2, and calculates the time difference between the receive timing points to use as a timing correct amount (S126). Then, the transmission timing of an ANCH is corrected based on the calculated timing correct amount, whereby frame synchronization is established in the uplink direction with respect to the target base station 14-2 (S128).

Thereafter, the mobile station 12 sends an uplink ANCH to request allocation of PRUs for EXCH to the target base station 14-2, using the PRU for ANCH obtained at S120, with the transmission power corrected at S124, at the transmission timing corrected at S128 (S130).

Having received the uplink ANCH from the mobile station 12, the base station 14-2 determines PRUs for EXCH composed of one or more PRUs to be allocated to the mobile station 12 (S132), and sends a downlink ANCH containing the determined PRUs for EXCH to the mobile station 12 (S134). As described above, the mobile station 12 receives allocation of a PRU for ANCH and PRUs for EXCH from the target base station 14-2.

Thereafter, when the mobile station 12 sends a connection request to the target base station 14-2 (S136), the base station 14-2, having received the connection request, confirms execution of a handover with the ASN gateway 18 (S138) and then sends a connection response to the mobile station 12 (S140). In the above, the ASN gateway 18 sends a path cancellation request to the base station 14-1 (S142) to release connection between the mobile station 12 and the base station 14-1 (S144).

According to the above described mobile communication system 10, as transmission of a timing correct channel (corresponding to uplink synchronous burst) by the mobile station 12 and transmission of a signaling control channel (information containing a timing correct amount, a new PRU for ANCH, and a transmission power correct amount) by the target base station 14-2 are not included in the handover sequence, it is possible to realize high speed handover and also to improve efficiency in use of radio resource.

Note that the present invention is not limited to the above described embodiment.

That is, application of the present invention is not limited to the next generation PHS, but the present invention has a wide application generally to a mobile communication system in which a mobile station simultaneously communicates with two or more base stations employing a TDMA system and an OFDMA system. For example, the present invention is applicable to a mobile communication system in which a mobile station carries out multi-link communication with two or more base stations at the same time.

The invention claimed is:
1. A mobile communication system comprising:
a first base station device; and
a second base station device;
wherein the first base station device and the second base station device are configured to carry out simultaneous communication with a mobile station device,
wherein at least one communication channel composed of a combination of any time slot according to time division multiple access and any subchannel according to orthogonal frequency division multiple access is used in the communication,
wherein a complex channel comprising one or more communication channels is used in the communication,
wherein the first base station device notifies the second base station device of a time slot used in the communication with the mobile station device,
wherein the second base station device allocates to the mobile station device at least one idle communication channel included in time slots different from the time slot notified by the first base station device, and
wherein the first base station device, when the communication channel allocated to the mobile station device comprises a plurality of time slots, restricts use of some of the time slots constituting the communication channel.

2. The mobile communication system according to claim 1, wherein the simultaneous communication occurs during a soft handover from the first base station device to the second base station device.

3. The mobile communication system according to claim 1, wherein a single channel composed of one communication channel is used in the communication.

4. A base station device for carrying out communication with a mobile station device, using at least one communication channel composed of a combination of any time slot according to time division multiple access and any subchannel according to orthogonal frequency division multiple access, the base station device comprising:
means for receiving a notification from another base station device, the notification identifying a time slot being used by the other base station device in communication with the mobile station device and indicating that the base station device should not allocate a communication channel in the identified time slot to the mobile station device; and
means for, based on the notification from the other base station device, allocating to the mobile station device at least one idle communication channel included in time slots other than the time slot identified in the notification.

5. The base station device according to claim 4, wherein the at least one idle communication channel comprises a physical resource unit for an Anchor Channel (ANCH) of the base station device.

6. The base station device according to claim 4, wherein the at least one idle communication channel comprises a plurality of communication channels.

7. The base station device according to claim 6, wherein the plurality of communication channels comprises a plurality of physical resource units of an Extra Channel (EXCH) of the base station device.

8. The base station device according to claim 4, wherein the notification identifies a physical resource unit for an Anchor Channel (ANCH) of the other base station device.

9. A channel allocation method for carrying out communication with a mobile station device, using at least one communication channel composed of a combination of any time slot according to time division multiple access and any subchannel according to orthogonal frequency division multiple access, the method comprising, by a first base station device:

a step of receiving a notification from a second base station device, the notification identifying a time slot being used by the second base station device in communication with the mobile station device and indicating that the first base station device should not allocate a communication channel in the identified time slot to the mobile station device; and based on the notification from the second base station device, allocating to the mobile station device at least one idle communication channel included in time slots other than the time slot identified in the notification.

10. The method according to claim 9, wherein the at least one idle communication channel comprises a physical resource unit for an Anchor Channel (ANCH) of the first base station device.

11. The method according to claim 9, wherein the at least one idle communication channel comprises a plurality of communication channels.

12. The method according to claim 11, wherein the plurality of communication channels comprises a plurality of physical resource units of an Extra Channel (EXCH) of the first base station device.

13. The method according to claim 9, wherein the notification identifies a physical resource unit for an Anchor Channel (ANCH) of the second base station device.

14. The method according to claim 9, further comprising, by the second base station device, restricting use of the time slots of the allocated at least one idle communication channel.

15. The method according to claim 14, wherein restricting use of the time slots of the allocated at least on idle communication channel comprises preventing allocation of the time slots by the second base station device to the mobile station device.

* * * * *